Aug. 14, 1945.  L. BROZEK  2,382,948
OPEN RETAINING RING
Filed Dec. 30, 1944

Inventor
Lawrence Brozek,

By *[signature]*
Attorney

Patented Aug. 14, 1945

2,382,948

UNITED STATES PATENT OFFICE 2,382,948

OPEN RETAINING RING

Lawrence Brozek, Jackson Heights, N. Y., assignor to Waldes Koh-I-Noor, Inc., Long Island City, N. Y., a corporation of New York Application December 30, 1944, Serial No. 570,697

4 Claims. (Cl. 85—8.5)

This invention relates to improvements in open retaining rings of the type adapted to be sprung into a seating groove formed in a shaft, pin or the like, and thereupon to form an artificial shoulder for securing a machine part against axial displacement relative to shaft.

Ordinary "open" retaining rings, i. e., retaining rings which subtend between their free legs an angle which only slightly exceeds a 180° angle and hence possess the advantage that they can be spread directly over the shaft and thereupon sprung into their grooves, are conventionally formed with uniform section height throughout their arcuate length and with an inner diameter which is approximately equal to that of the groove bottom. Despite the above referred to advantage of open retaining rings, as distinguished from the nearly closed type of retaining rings which can be spread a relatively limited amount only and hence have to be applied over the end of a shaft and thereupon shifted along the shaft in axial direction so as to be sprung in their grooves, their construction gives rise to two inherent defects. First, ordinary open rings of known type, due to their uniform section height throughout, cannot maintain their circularity when spread, but, on the other hand, deform ovally, with the result that to insure seating of such rings they must be formed with inner ring diameter equalling approximately the diameter of the groove bottom. Hence, such rings do not have any substantial pressure fit against their groove bottom and they accordingly can be easily turned around in the groove. The second disadvantage of such rings arises from the relatively small angle that can be included by the ring segment, which usually does not substantially exceed 180°, because, otherwise, in spreading the ring directly over the shaft as a preliminary to seating the same, excess spreading of the ring would be necessary and would result in a permanent set thereof, as well as an impairment of the fit of the ring against the groove bottom.

A principal object of the present invention is to improve the so-called open retaining ring and to provide such a ring capable of having a relatively tight pressure fit against the bottom of its groove, and which is moreover characterized by a pressure contact with groove bottom which is sufficiently great as to overcome the possibility of the ring turning in its groove.

A further object of the invention is the provision of an open retaining ring capable of being spread directly over its shaft having in a plane perpendicular to its axis and which has substantially greater arcuate length than is possible with ordinary open retaining rings as presently constructed, so that the arc of its contact with the bottom of the groove against which the improved ring seats, as well as the holding power of the ring thereagainst, is correspondingly increased. Yet another object of the invention is the provision of an open retaining ring which is so constructed that it maintains its circularity as it is spread directly over a shaft preliminary to being seated in its groove, and which accordingly may be provided with an inner diameter which is smaller than that of the groove bottom whereby to engage tightly against the groove bottom for its full arcuate length.

The above and other features characterizing the invention and the objects thereof will be apparent from the following description taken with the drawing illustrating a physical embodiment of the invention, in which—

Figure 1:
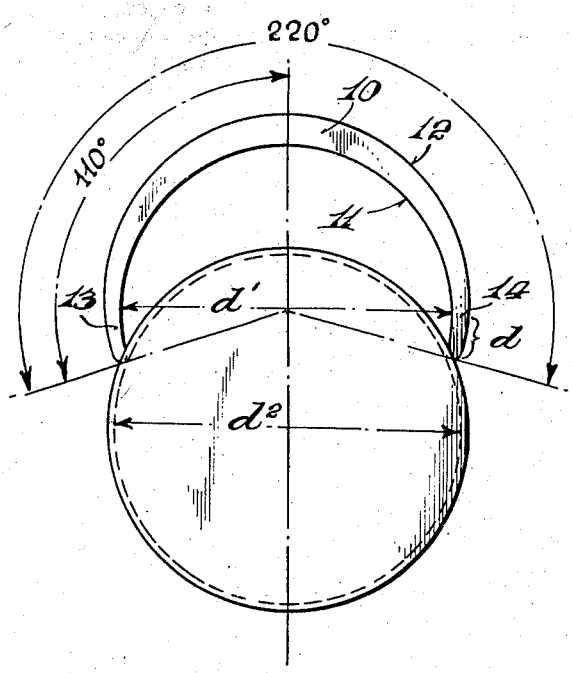
Fig. 1 illustrates an open retaining ring according to the invention, in position to be spread directly over the shaft into its seating groove provided therein.
Figure 3:
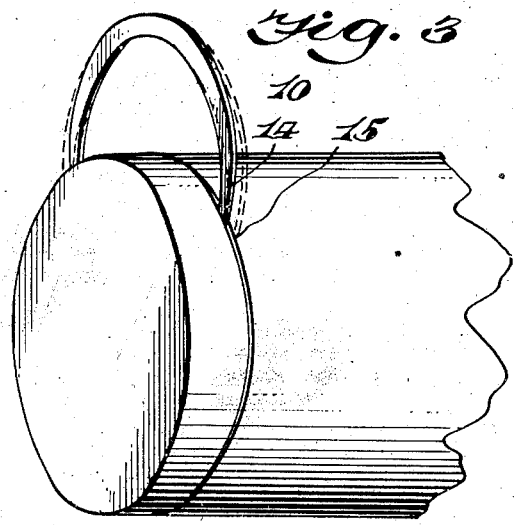
Fig. 3 is a perspective view of the ring and shaft in the same relative positions shown in Figs. 1 and 2.

Referring to the drawing, an open retaining ring according to the invention is shown in face view at 10 in Figs. 1 and 3 and comprises a ring-form segment of spring metal, preferably spring steel. The inner and outer edges 11, 12 extend along circular arcs as shown, and it is a feature of the invention that the inner circular edge 11 is eccentric to the outer circular edge 12, so that the section height (width) of the ring segment tapers or decreases from its middle section to the free ends 13, 14 thereof. The eccentricity of the circular edges of the ring segment is so chosen that at least the inner circular edge 11 thereof maintains its circularity as the ring is deformed, for example, in spreading apart the ends 13, 14.

Figure 2:
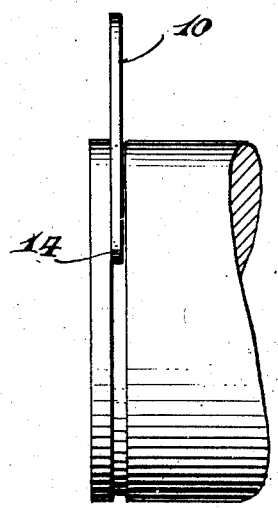
Fig. 2 is a side view of the ring and shaft illustrated in Fig. 1.
Figure 4:
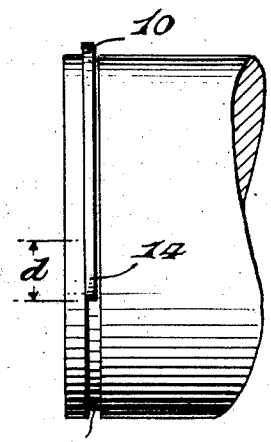
Fig. 4 is a side view of an open ring according to the invention completely sprung into its shaft groove.

Since the legs 13 and 14 of the ring segment have decreasing section heights, and hence decreasing moments of inertia, they are relatively flexible as compared with the free legs of the ordinary open retaining rings of uniform section height throughout. This flexibility, taken with the property of the ring segment in maintaining circularity under deformation, makes it possible to substantially increase the angle subtended by such a ring segment according to the invention, as compared with an ordinary open ring of uniform section height throughout, without impairing its ability of being spread directly over the shaft containing its seating groove, as indicated in dotted lines, Fig. 3. Thus, as diagrammatically shown in Fig. 1, the improved open ring according to the invention may subtend or include an arc of approximately 220°, as compared with ordinary retaining rings which can include an angle which only slightly exceeds a 180° angle. Accordingly, a ring according to the invention possesses greater arcuate length than prior open rings and hence may extend along the bottom of its seating groove 15, Figs. 2 and 3, by the correspondingly greater amount represented by the distance of approximately $2 \times d$ (Figs. 1 and 4). Due to the greater length both of ring segment and of the arcuate contact between ring and groove bottom, a ring according to the invention is more firmly held in its groove than is the ordinary open retaining ring.

While the increased arcuate length of the ring segment results in the gap-width thereof, i. e., the length of the chord extending between the ring ends 13, 14, being smaller than the diameter $d^2$ of the ring seating groove, nevertheless the gap-width of a tapered spring ring segment extending along an arc of approximately 220° is large enough to permit the ring element to be spread directly over the shaft containing its seating groove. This feature is of distinct advantage in assembling the ring, as the assembly operation can be effected by simply spreading the ring directly over the shaft in the plane of the groove and thereupon springing the ring into the groove. Hence, a ring according to the invention may be assembled without the requirement characterizing prior substantially closed rings of spreading the latter over the end of the shaft and thereupon shifting the spread ring axially along the length of the shaft to the plane of the seating groove.

Moreover, due to the fact that the improved open retaining ring maintains its circularity when spread, the inner effective diameter $d'$ thereof (corresponding to its inner circular edge 11) can be formed less than the diameter $d^2$ of the groove bottom. Hence, a ring according to the invention, when sprung into its seating groove (Fig. 4), bears with pressure fit against the groove bottom throughout its full arcuate length and hence does not tend to shift circumferentially around the groove, as is the case with ordinary open rings whose inner diameter must correspond substantially with that of the groove bottom.

Without further analysis, it will be observed that the improved open retaining ring of the invention, in addition to its ability to be sprung directly over a shaft into its groove, as distinguished from being shifted axially along the shaft to a position in which it can be seated, overcomes the disadvantages of ordinary open retaining rings of uniform section height throughout and of inner diameter corresponding to that of the groove bottom. More particularly, the improved open retaining ring of the invention can be pressure fitted against its groove bottom and, due to the increased arcuate length thereof permitted by its enhanced flexibility and its property of maintaining circularity when deformed, provides a greater length of contact between ring and groove bottom than is possible with prior open retaining rings.

As many changes could be made in carrying out the above constructions without departing from the scope of the invention, it is intended that all matter contained in the above description or shown in the accompanying drawing shall be interpreted as illustrative and not in a limiting sense.

I claim:

1. An open retaining ring of the type adapted to be sprung into a seating groove formed in a shaft and the like comprising a ring-form segment of spring metal, the gap-width of the segment being smaller than the diameter of the groove but large enough to permit the segment to be spread directly over the shaft in the plane of the seating groove, the inner and outer edges of the ring segment extending along circular arcs which are eccentric to each other and arranged so that the section heights of the ring segment decrease from the middle section to the free ends thereof.

2. An open retaining ring of the type adapted to be spread directly over a shaft in a plane perpendicular to its axis and thereupon sprung into a seating groove formed therein comprising a ring-form segment of spring metal extending along a circular arc of approximately 220°, the inner and outer circular edges of the ring segment being eccentric to each other and arranged so that the section heights of the ring segment decrease from the middle section to the free ends thereof.

3. An open retaining ring according to claim 1, wherein the inner circular edge of the ring has diameter which is smaller than the diameter of the bottom of the groove in which the ring is to be sprung.

4. An open retaining ring according to claim 2, wherein the inner circular edge of the ring has diameter which is smaller than the diameter of the bottom of the groove in which the ring is to be sprung.

LAWRENCE BROZEK.